United States Patent
Harrington et al.

(10) Patent No.: US 7,342,773 B2
(45) Date of Patent: Mar. 11, 2008

(54) CAPACITOR CONTAINING ALUMINUM ANODE FOIL ANODIZED IN LOW WATER CONTENT GLYCERINE-PHOSPHATE ELECTROLYTE

(75) Inventors: Albert Kennedy Harrington, Mauldin, SC (US); John Tony Kinard, Greer, SC (US); Brian John Melody, Greer, SC (US); David Alexander Wheeler, Williamston, SC (US); Duane Earl Stenzinger, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 11/352,050

(22) Filed: Feb. 10, 2006

(65) Prior Publication Data

US 2006/0124465 A1   Jun. 15, 2006

Related U.S. Application Data

(60) Division of application No. 10/673,816, filed on Sep. 29, 2003, which is a continuation-in-part of application No. 10/390,529, filed on Mar. 17, 2003, now Pat. No. 7,125,610.

(51) Int. Cl.
 *H01G 9/02* (2006.01)
(52) U.S. Cl. ........... 361/525; 361/516; 361/519; 361/523; 361/528; 361/530
(58) Field of Classification Search ........ 361/516–519, 361/523–534, 508–512, 502–504; 29/25.01, 29/25.03; 501/62.2
 See application file for complete search history.

(56) References Cited

U.S. PATENT DOCUMENTS

| | | | |
|---|---|---|---|
| 1,710,073 A | 4/1929 | Ruben | |
| 1,891,207 A | 12/1932 | Ruben | |
| 2,826,724 A | 3/1958 | Lilienfed | 317/230 |
| 3,733,291 A | 5/1973 | Alwitt et al. | 204/29 |
| 4,113,579 A | 9/1978 | Randall et al. | 205/153 |
| 4,252,575 A | 2/1981 | Bernard | 148/6.27 |
| 4,481,084 A | 11/1984 | Chen et al. | 204/42 |
| 4,582,574 A | 4/1986 | Nguyen et al. | 204/27 |
| 5,674,371 A * | 10/1997 | Patel | 205/105 |
| 5,837,121 A | 11/1998 | Kinard et al. | 205/322 |

(Continued)

OTHER PUBLICATIONS

International Search Report, PCT/US2004/008037, Jul. 26, 2004, Lescop.

*Primary Examiner*—Nguyen T. Ha
(74) *Attorney, Agent, or Firm*—Joseph T. Guy; Nexsen Pruet, Inc.

(57) ABSTRACT

A capacitor comprising an aluminum anode and a dielectric layer comprising phosphate doped aluminum oxide and process for making the capacitor. Furthermore, the capacitor is formed by the process of: forming an aluminum plate; pre-hydrating the aluminum; contacting the plate with an anodizing solution comprising glycerine, 0.1 to 1.0%, by weight, water and 0.01 to 0.5%, by weight, orthophosphate; applying a voltage to the aluminum plate and determining an initial current; maintaining the first voltage until a first measured current is no more than 50% of the initial current; increasing the voltage and redetermining the initial current; maintaining the increased voltage until a second measured current is no more than 50% of the redetermined initial current, and continuing the increasing of the voltage and maintaining the increased voltage until a final voltage is achieved.

7 Claims, 5 Drawing Sheets

U.S. PATENT DOCUMENTS

| | | |
|---|---|---|
| 5,926,357 A | 7/1999 | Elias et al. ............... 361/302 |
| 5,935,408 A | 8/1999 | Kinard et al. ............. 205/234 |
| 6,149,793 A | 11/2000 | Melody et al. ............ 205/234 |
| 6,231,993 B1 * | 5/2001 | Stephenson et al. ..... 428/472.1 |
| 6,235,181 B1 | 5/2001 | Kinard et al. ............. 205/148 |
| 6,267,861 B1 | 7/2001 | Kinard et al. ............. 205/171 |
| 6,346,185 B1 | 2/2002 | Kinard et al. ............. 205/316 |
| 6,409,905 B1 | 6/2002 | Melody et al. ............ 205/234 |
| 6,436,268 B1 | 8/2002 | Melody et al. ............ 205/234 |
| 6,459,565 B1 | 10/2002 | Lessner et al. ............ 361/508 |
| 6,808,615 B2 * | 10/2004 | Lessner et al. ............ 205/324 |
| 2004/0188269 A1 * | 9/2004 | Harrington et al. ........ 205/233 |

* cited by examiner

CAPACITOR CONTAINING ALUMINUM ANODE FOIL ANODIZED IN LOW WATER CONTENT GLYCERINE-PHOSPHATE ELECTROLYTE

RELATED APPLICATIONS

The present application is a divisional application of pending U.S. application Ser. No. 10/673,816 filed Sep. 9, 2003 which is a continuation-in-part of U.S. application Ser. No. 10/390,529, filed Mar. 17, 2003 now U.S. Pat. No. 7,125,610 issued Oct. 24, 2006 both of which are incorporated herein by reference thereto.

BACKGROUND OF THE INVENTION

The present invention is related to an electrolyte solution for anodizing aluminum anode foil for use in electrolytic capacitors and the capacitors containing this anode foil.

We have found that low water content variations of the glycerine and orthophosphate-containing electrolytes described in U.S. Pat. No. 6,409,905, which is incorporated herein by reference thereto, may be used for the anodization of aluminum foil to voltages sufficiently high to facilitate the use of the aforementioned foil in intermediate and high voltage electrolytic capacitors.

Previously, the maximum anodizing voltage obtainable from the aqueous phosphate solutions traditionally used to anodize aluminum capacitor foil for applications requiring extreme foil stability and oxide hydration resistance was about 220 volts, as stated in U.S. Pat. No. 3,733,291. The corrosion of the foil being anodized in aqueous phosphate solutions increases with the anodizing voltage and is sufficiently severe to result in dielectric failure above about 220 volts. The corrosion by-products formed during aluminum foil anodizing in aqueous phosphate solutions must be removed from the solution via filtering, etc., or they will deposit upon the foil and anodizing tank components in amounts sufficient to interfere with the anodizing process.

The difficulties encountered with aqueous phosphate anodizing of aluminum foil for use in relatively low voltage capacitors are such that, in spite of the superior electrical stability of foil anodized in phosphate solutions, nearly all of the low voltage foil produced today is anodized in non-phosphate solutions with the exception of a relatively small amount of phosphate which may be present to help impart hydration resistance. Due to the voltage limitations of aqueous phosphate anodizing solutions mentioned above, intermediate and high voltage capacitor foils have not traditionally been anodized in aqueous phosphate solutions.

Aluminum electrolytic capacitors for use at intermediate voltages typically contain anode foil hydrated by passing the foil through a hot water bath prior to anodizing, as defined in U.S. Pat. No. 4,582,574. These capacitors are typically for use at voltages from 150 to 250 volts and contain anode foil anodized to about 200 to 350 volts. This pre-anodizing hydration step is carried out in order to reduce the amount of electric current required to form the anodic oxide dielectric layer and is normally applied to foils to be anodized to 200 volts and above, as described in U.S. Pat. No. 4,481,073. By carefully adjusting the parameters of the pre-anodizing hydration process, as described in U.S. Pat. No. 4,242,575, the hydration process may be successfully employed with foils which are anodized to voltages significantly less than 200 volts. The energy savings associated with the pre-anodizing hydration process is sufficiently great that the vast majority of aluminum foil manufactured today is processed in this manner.

The crystallinity of the anodic oxide present on aluminum anode foil is another factor directly determining the cost of the foil for a given rating of capacitor. Crystalline anodic aluminum oxide has a higher withstanding voltage per unit thickness than does amorphous anodic aluminum oxide. As a result of the higher withstanding voltage of crystalline oxide, only about 10 angstroms of crystalline oxide is required to support each volt of applied field during anodizing as compared with approximately 14 angstroms for each volt of applied field for amorphous oxide. As a result of the higher withstanding voltage of crystalline anodic aluminum oxide, the capacitance of anode foil coated with crystalline oxide may be as much as about 40% higher than anode foil anodized to the same voltage but coated with amorphous oxide.

Crystalline anodic aluminum oxide may be readily produced by anodizing aluminum anode foil in solutions containing salts of dicarboxylic acids as the primary ionogen, as described in U.S. Pat. No. 4,481,084. Anodic oxide formation in solutions of dicarboxylic acid salts (generally at 70-95° C.) may be combined with a pre-anodizing foil hydration step to achieve a very significant savings in both energy and foil consumed per unit capacitance at a given anodizing voltage.

Hydration resistance, which is an important consideration for foil used in electrolytic capacitors, may be enhanced by the inclusion of a small amount of an alpha-hydroxy carboxylic acid (such as tartaric acid or citric acid) in the anodizing electrolyte solution, as described in U.S. Pat. No. 4,481,084. The tendency of anodic aluminum oxide to absorb water, forming a variety of hydrated species having impaired dielectric properties appears to be, at least in part, a function of the hydration status of the outermost portion of the anodic oxide at the end of the anodizing process. Lilienfeld, in U.S. Pat. No. 2,826,724 states that "it is the hydration stratum of the oxide film, adjacent the film-electrolyte interface, which causes most of the power loss; and that the progressive development of hydration at the interface causes the aforesaid instability."

Alwitt, in U.S. Pat. No. 3,733,291, describes a method of removing the residual hydration layer from the outer surface of anodized aluminum capacitor foil which has been exposed to a pre-anodizing hydration step (Alwitt refers to this as a "preboil") prior to anodizing in order to conserve electrical energy during anodizing. Alwitt employs a dilute phosphoric acid solution, generally with a small chromate content (to inhibit corrosion), to dissolve the outer, hydration layer.

In addition to the problems associated with the residual hydration layer on anodized foil, which has been processed through a pre-anodizing hydration or preboil step prior to anodizing, there exists another potential problem with the stability of the anodic oxide grown on preboiled aluminum foil. The formation of the anodic oxide on preboiled foil takes place via a dehydration reaction in which the layer of pseudoboehmite (i.e. hydration product) is progressively dehydrated from the foil-oxide interface outward. Apparently, the dehydration does not take place through the ejection of water molecules but rather through the ejection of hydrogen ions and the liberation of oxygen gas within the body of the oxide. The liberated oxygen gas may become trapped within the anodic oxide, rendering the oxide susceptible to cracking and dielectric failure in service. This topic is treated well in the article, entitled: "Trapped Oxygen in Aluminum Oxide Films and Its Effect on Dielectric Stability", by Walter J. Bernard and Philip G. Russell (*Journal of the Electrochemical Society*, Volume 127, number 6, June 1980, pages 1256-1261).

Stevens and Shaffer describe a method of determining the concentration of oxide flaws as a function of distance from the metal-oxide interface for trapped-oxygen flaws which are exposed via thermal relaxation steps followed by re-anodizing under carefully controlled and monitored conditions ("Defects in Crystalline Anodic Aluminum", by J. L. Stevens and J. S. Shaffer, *Journal of the Electrochemical Society*, volume 133, number 6, June 1986, pages 1160-1162).

Stabilization processes have been developed which tend to expose and repair trapped oxygen flaws (in anodic oxide films on preboiled foils) as well as impart hydration resistance to the oxide film. Examples of these processes are described in U.S. Pat. Nos. 4,113,579 and 4,437,946.

For maximum anodic oxide film stability on aluminum foil, it is desirable to form the anodic film in a phosphate solution and, again, for maximum stability via maximum phosphate content throughout the oxide thickness, the foil should not be preboiled prior to the anodizing process.

The skilled artisan has therefore been limited in the ability to form oxides on the anode at high voltage, particularly with phosphate incorporation into the oxide layer.

BRIEF SUMMARY OF THE INVENTION

It is an object of the present invention to provide an improved process for anodizing aluminium.

It is another object of the present invention to provide a process for anodizing an aluminum surface at high voltage, over 220 volts, incorporating the advantages offered by phosphate in the oxide layer. This has previously been unavailable to those of ordinary skill in the art.

A particular feature of the present invention is that one variation of the electrolyte family described in U.S. Pat. No. 6,409,905, i.e, glycerine-based electrolytes containing orthophosphate as the anionic portion of the ionogen may be used to anodize aluminum foil to high voltages, for example 1000 volts. The use of these electrolytes, then, overcomes the limitations of traditional aqueous phosphate electrolytes in so far as the maximum anodizing voltage achievable with aqueous electrolytes (i.e. 220 volts, as given in U.S. Pat. No. 3,733,291) may be exceeded by many hundreds of volts. Furthermore, the use of low-water content glycerine-based, orthophosphate-containing electrolyte solutions for anodizing aluminum avoids the corrosion of the anode foil by essentially eliminating the subsequent formation of aluminum phosphate precipitates which normally occurs during the anodization.

A preferred embodiment is provided in a capacitor comprising an aluminum anode and a dielectric layer comprising phosphate doped aluminum oxide. Particularly, the anodic dielectric comprises, at least, 25%, by weight, aluminum phosphate and the capacitor manufactured therefrom is capable of withstanding greater than 250 volts.

Yet another embodiment is provided in a process for preparing a capacitor. The process comprises fabricating an aluminum plate. The plate is contacted with an anodizing solution comprising glycerine, 0.1 to 2.0%, by weight, water and 0.01 to 0.5%, by weight, orthophosphate. A voltage is applied to the aluminum plate of at least 220 volts.

Yet another embodiment is provided in process for preparing a capacitor. The process comprises fabricating a, preferably etched, aluminum plate. The plate is preferably pre-hydrated and then contacted with an anodizing solution comprising glycerine, 0.1 to 2.0%, by weight, water and 0.01 to 0.5%, by weight, orthophosphate. A voltage is applied to the aluminum plate and an initial current is determined. The voltage is maintained until a first measured current is no more than 50% of the initial current. The voltage is then increased and initial current redetermined. The increased voltage is maintained until a second measured current is no more than 50% of the redetermined initial current. The voltage increases and voltage maintenance are continued until a final voltage is achieved.

A particularly preferred embodiment is provided in a capacitor comprising an aluminum anode and a dielectric layer comprising phosphate doped aluminum oxide. The capacitor is formed by the process of: fabricating an aluminum plate; immersing the aluminum plate in hot/boiling water to produce a hydrated oxide coating on the plate; contacting the plate with an anodizing solution comprising glycerine, 0.1 to 2.0%, by weight, water and 0.01 to 0.5%, by weight, orthophosphate; applying a positive voltage to the aluminum plate and determining an initial current; maintaining the first voltage until a first measured current is no more than 50% of the initial current; increasing the voltage and redetermining the initial current; maintaining the increased voltage until a second measured current is no more than 50% of the redetermined initial current, and continuing the increasing of the voltage and maintaining the increased voltage until a final voltage is achieved.

DETAILED DESCRIPTION OF THE INVENTION

The inventors of the present application have found a particular modification of the electrolytes described in U.S. Pat. No. 6,409,905 to be useful for the anodizing of aluminum foil to several hundred volts. Generally speaking, glycerine solutions of ammonium, amine, or alkali metal orthophosphate salts containing from about 0.01 wt % to about 0.5 wt % soluble orthophosphate salt and from about 0.1% to about 2.0% by weight water, more preferably about 0.1% to about 1.0% by weight water, may be successfully used to anodize aluminum foil to high voltages. Lower orthophosphate salt concentrations and higher solution resistivities are preferably used for higher anodizing voltages in accordance with the principles of aluminum anodizing which have long been established by those familiar with the art. For most high voltage applications, we have found it to be advantageous to employ dibasic potassium phosphate as the ionogen, at a preferred concentration of 0.01% to 0.1%, by weight, depending upon the maximum desired voltage.

The electrolyte soluble orthophosphate salt may be an ammonium phosphate, an alkali metal phosphate, an amine phosphate, or mixtures thereof. Suitable alkali metal salts include, but are not limited to, mono-sodium phosphate, di-potassium phosphate, and sodium potassium phosphate. Suitable ammonium salts include, but are not limited to, mono-ammonium phosphate or di-ammonium phosphate.

The solution temperature employed may be varied over a wide range, for example, from room temperature, or about 25° C., to about 125° C., but the temperature is most conveniently maintained between about 80° C. and 105° C. In this range (i.e. about 80° C. and 105° C.) the water content of the electrolyte will tend to be automatically maintained between about 0.2% and 1.0% by contact with the atmosphere through the vapor pressure of the water present and the hygroscopicity of the glycerine solvent.

It is preferable that the anode metal is placed into the anodizing solution followed by sequentially increasing the voltage stepwise with current age down prior to the next increment. The voltage increase is preferably done in increments. The maximum size of the increment is chosen to be less than that necessary to create failure in the oxide. As the resistivity of the anodizing solution increases, the maximum voltage step which can be implemented without oxide failure increases. Based on the present invention, a voltage step of less than 75 volts is preferable. Higher steps can be taken, particularly at higher voltages with high resistivity anodizing solutions, yet the time required for adequate age down increases and therefore no substantial benefit is observed. Smaller voltage increases can be employed with the disadvantage being loss of efficiency. It is most desired that the voltage increase be at least 20 volts per step to optimise the efficiency without compromising product quality. A voltage increase of about 50 volts for each step has been determined to be optimal for the present invention.

After each voltage increase the voltage is maintained until a sufficient decrease in current is realized. The more the current is allowed to decrease prior to the next voltage increase the better for efficiency of anodization yet a decrease is observed in productivity. It is preferred that the anode be maintained at voltage long enough to allow the current to decrease to less than 50% of the original current and more preferably less than 30% of the original current. The upper limit of hold time for current decrease is based on efficiency. Allowing the current to decrease to 1%, or less, of the original current is acceptable yet the loss in efficiency exceeds the advantages obtained. It is most preferred that the voltage be maintained at each step for a time sufficient to allow the current to decrease to about 10-30% of the original current. This has been determined to be an optimal condition between suitable product and manufacturing efficiency. It has been found that a decrease in current to about 20% of the original current at each voltage step is optimum to achieve superior product performance with reasonable manufacturing efficiency. The current may be allowed to decrease to a low level at the last voltage step in order to obtain a very low leakage dielectric film.

As mentioned above, the foil, if etched to increase the microscopic surface area as usually done with capacitor anode foil, should be pre-hydrated by immersion for a short time (e.g. 5 minutes) in hot or boiling water in order to produce a coating of hydrated oxide (pseudoboehmite) on the foil surface. Etched foil which is not pre-hydrated and which is anodized in the electrolytes of the present invention tends to wrinkle or warp catastrophically at an applied voltage of approximately 250 volts. We have found that the warping of the foil with increasing voltage in the electrolytes of the present invention may be almost completely prevented by the foil pre-hydration step.

The process for manufacturing stacked foil capacitors is known in the art. Etched foil coupons, suspended from process bars or held in anodizing frames, etc., are first given a pre-hydration step. The coupons are then immersed in an anodizing electrolyte of the present invention and are processed as described above.

The anodized and rinsed coupons are then ready for processing into capacitors.

The anodic dielectric layer prepared in accordance with the present invention demonstrated superior hydration resistance to those of the prior art. The hydration resistance is sufficient to essentially eliminate deterioration of the oxide which normally occurs during standing at low voltage or in an open circuit. It is a well-known technique in the art to overcome oxide deterioration by charging the capacitor to near working voltage during periods of low voltage or open circuit. This is typically referred to as a reformation charge. The necessity for a reformation charge is particularly detrimental to battery-operated devices such as medical implantable devices and the like. The reformation charge decreases the effective life of the battery due to the non-therapeutic charging of the capacitor.

Figure 6:
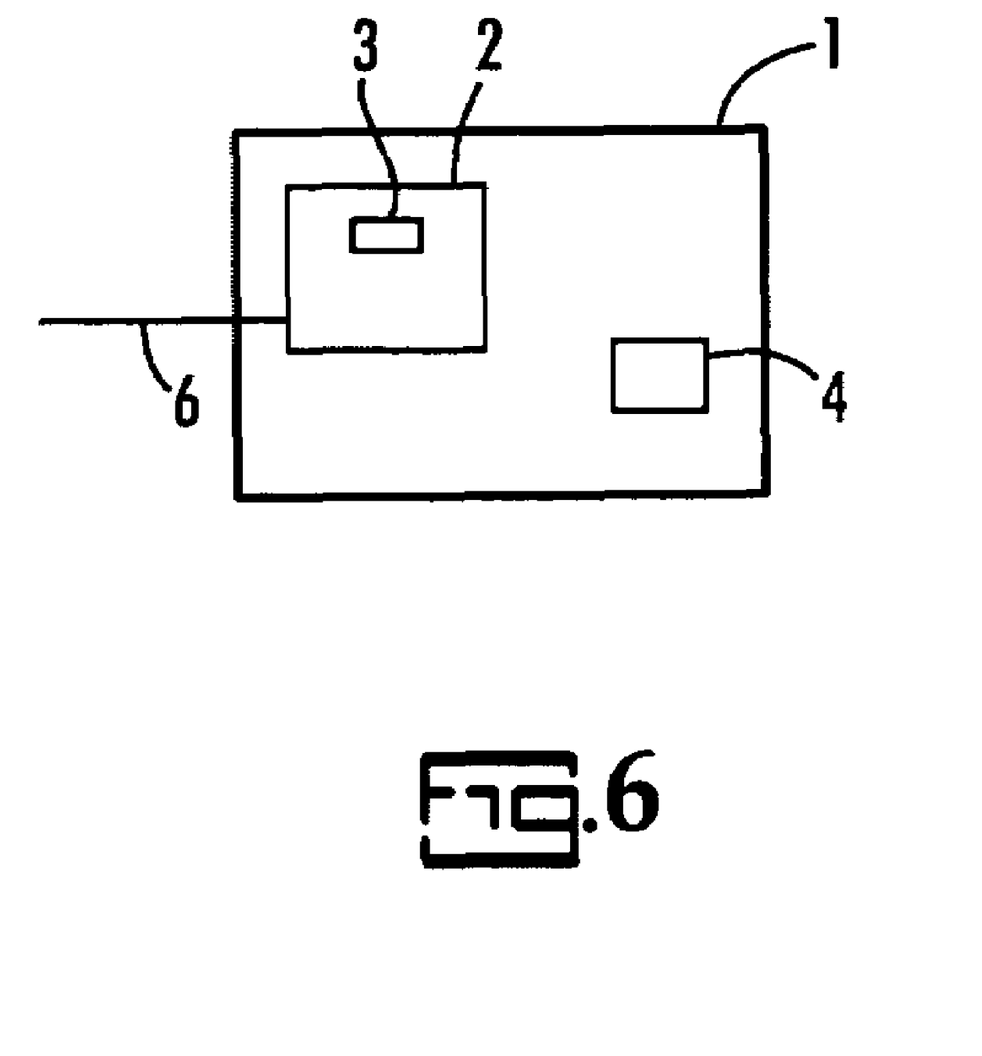
FIG. 6 is a device of the present invention comprising a capacitor with an anode anodized in accordance with the present invention.

A particularly preferred embodiment of the present invention is provided in FIG. 6. In FIG. 6, the device, generally represented at 1, comprises an electrical circuit, 2, which further comprises a capacitor, 3, of the present invention. A battery, 4, energizes the circuit to monitor, record, or provide a response through at least one lead, 6. The battery, circuit, capacitor and lead are all in electrical contact as well known in the art of devices.

The device is any implantable medical device including particularly pace makers and heart defibrillators. The device is typically implanted in a patient and operates in a semi-self sufficient manner relying on battery charge. By incorporating a capacitor of the present invention the battery life is extended thereby extending the time that an implantable device can be employed without battery maintanence.

EXAMPLES

Example 1

Figure 1:
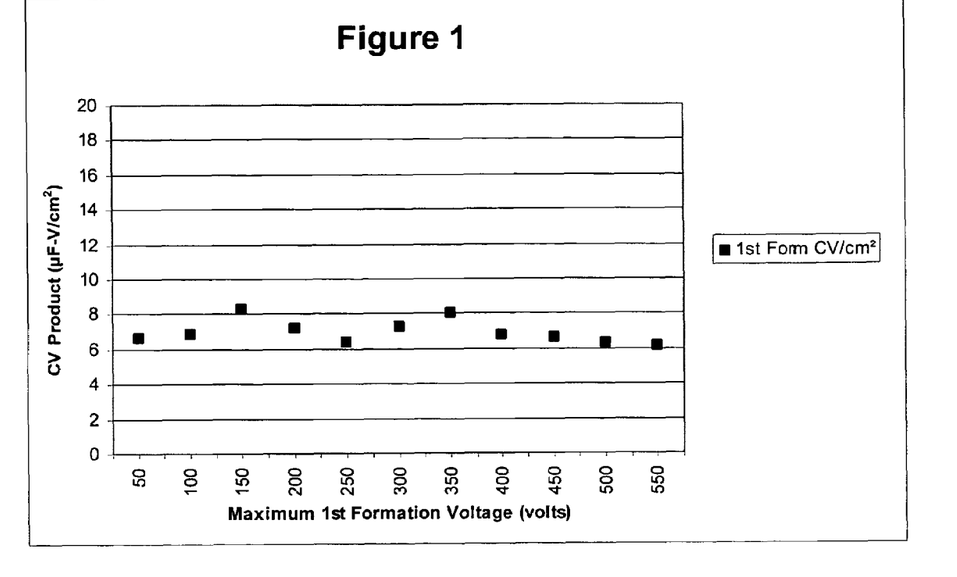
FIG. 1 is a chart illustrating CV Product as a function of Maximum $1^{st}$ Formation Voltage.

FIG. 1 shows the results obtained with unetched aluminium foil coupons which were exposed to water at 95° C.±5° C. for 5 minutes prior to anodizing. These coupons were anodized in 50 volt steps in an electrolyte solution consisting of 0.05% dibasic potassium phosphate and approximately 1% water in glycerine at 95° C.±5° C. After each voltage step, the current was allowed to "age-down" to below 20% of the initial value at each voltage step before again raising the voltage. In this case the CV product of approximately 7 microfarad-volts/cm$^2$ is that commonly found for crystalline anodic aluminum oxide. There is no observed capacitance penalty for anodizing in the phosphate anodizing solution.

Example 2

In order to determine the relative capacitance obtained at a given voltage, most conveniently expressed as the (capacitance)×(voltage) or CV product, electrolytes of the present invention were compared to traditional anodizing electrolytes. A series of pre-hydrated aluminium coupons were etched using a traditional chloride etching process to achieve an etch structure. The etched foil was anodized to various voltages in a stepwise manner. The capacitance of each coupon was then measured and the results expressed as CV product at each anodizing voltage.

Inventive Example 2 was prepared by processing an etched aluminum foil in an electrolyte comprising about 0.01 to 0.1%, by weight potassium phosphate and glycerine with water content below about 2%, by weight. Each sample was subjected to an initial voltage, typically about 100 V, and maintained at the initial voltage to allow the current to decrease to about 20% of the initial current. The voltage was then increased by about 50 V and maintained for an age down period. The voltage was sequentially increased and held until the final voltage was achieved. When the final voltage was achieved voltage was maintained until the current was approximately 1 mA/cm$^2$.

Comparative Example 3 was prepared in a manner similar to Example 3 wherein the etched aluminum foil was processed in an electrolyte comprising boric acid, water and ammonium pentaborate. Examples 2 and 3 were each subjected to 300V, 550V and 800V formation processes. The capacitance was determined and reported as a 10 cm$^2$ coupon capacitance value. The CV product was determined, at the formation voltage, at various frequencies. The results are contained in Table 1.

TABLE 1

| | | \multicolumn{5}{c}{Hz} | | | | |
|---|---|---|---|---|---|---|
| | | 100 | 120 | 1000 | 10000 | 100000 |
| 300 V Formation | | \multicolumn{5}{c}{Capacitance (uF/Coupon)} | | | | |
| Capacitance | Example 3 | 9.17 | 9.06 | 8.72 | 8.34 | 5.60 |
| | Example 2 | 10.61 | 10.50 | 9.47 | 8.56 | 5.46 |
| | | \multicolumn{5}{c}{CV Product (V-uF/cm2)} | | | | |
| CV Product | Example 3 | 275 | 272 | 262 | 250 | 168 |
| | Example 2 | 318 | 315 | 284 | 257 | 164 |
| 550 V Formation | | \multicolumn{5}{c}{Capacitance (uF/Coupon)} | | | | |
| Capacitance | Example 3 | 4.03 | 4.01 | 3.77 | 3.65 | 2.94 |
| | Example 2 | 4.49 | 4.43 | 4.00 | 3.65 | 2.82 |
| | | \multicolumn{5}{c}{CV Product (V-uF/cm2)} | | | | |
| CV Product | Example 3 | 222 | 221 | 207 | 201 | 162 |
| | Example 2 | 247 | 244 | 220 | 201 | 155 |
| 800 V Formation | | \multicolumn{5}{c}{Capacitance (uF/Coupon)} | | | | |
| Capacitance | Example 3 | 1.52 | 1.50 | 1.38 | 1.32 | 1.21 |
| | Example 2 | 2.29 | 2.26 | 2.02 | 1.85 | 1.54 |
| | | \multicolumn{5}{c}{CV Product (V-uF/cm2)} | | | | |
| CV Product | Example 3 | 122 | 120 | 110 | 106 | 97 |
| | Example 2 | 183 | 181 | 161 | 148 | 123 |

Figure 2:
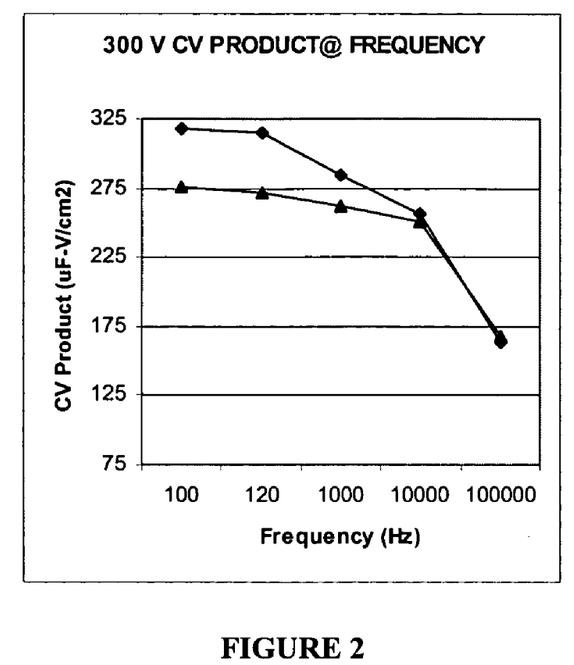
FIGS. 2-4 are charts of CV Product as a function of frequency for anodes anodized to 300 V, 550 V and 800 V respectively.
Figure 3:
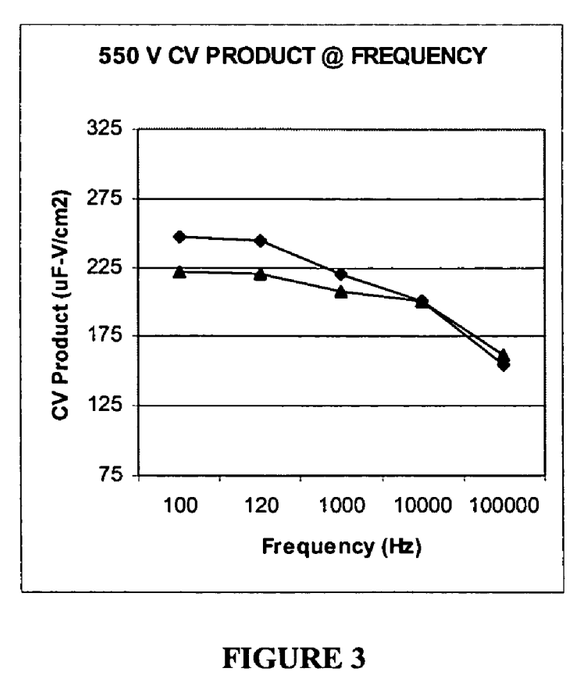
Figure 4:
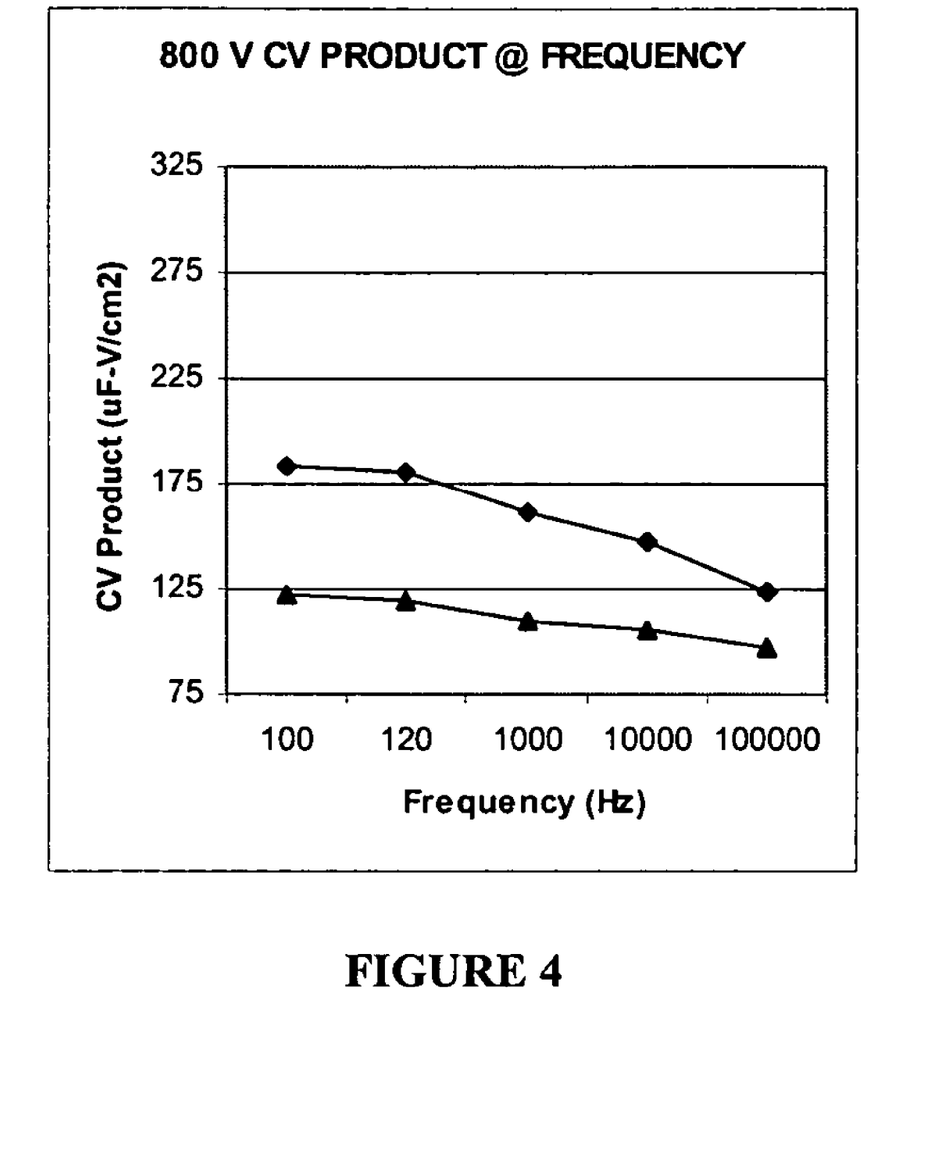
Figure 5:
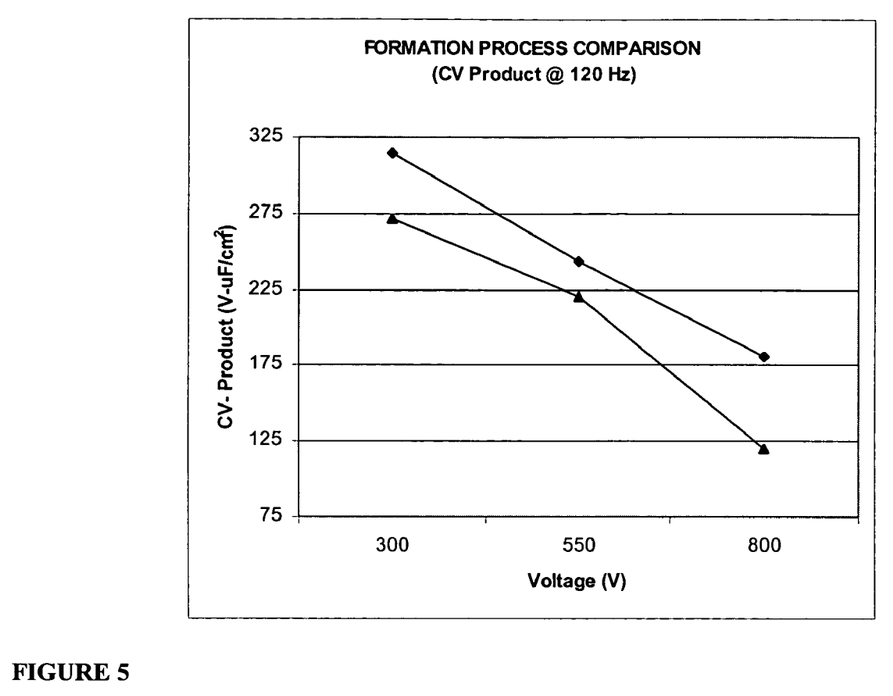
FIG. 5 is a chart of CV Product as a function of formation voltage at a frequency of 120 Hz.

The results presented in Table 1 are reproduced in graphical form in the figures. In the figures the diamonds (□) represents results obtained from Example 2 and the triangle (Δ) represent Example 3. FIGS. 2-4 contain a graphical representation of the CV Product (μF-V/cm$^2$) as a function of frequency (Hz) at 300 V, 550V and 800V respectively. In each case the improved capacitance is demonstrated for the inventive example. FIG. 5 contains a graphical representation of the CV Product (μF-V/cm$^2$) as a function of voltage (V) at a frequency of 120 Hz. The advantages of the inventive samples are clearly demonstrated to provide a higher capacitance.

The demonstrated improvement in capacitance, as represented by the CV Product represents a substantial improvement in the art. An improvement of this magnitude is typically not observed except through multiple cumulative improvements typically achieved over long periods of time. These improvements allow the formation of a capacitor which is highly resistant to the degradation associated with hydration of the oxide layer. The improved capacitor therefore allows the manufacture of devices, particularly implantable medical devices, which have extended battery life. It is well known in the art that extended battery life is a substantial benefit manifest as further miniaturization, extended periods between battery maintenance or combinations thereof both of which are a continuing demand in the art of implantable medical devices.

The foil anodized using the methods and electrolytes of the present invention are comparable in capacitance (or CV product) to commercially anodized foil having a similar etch structure. There is no penalty, so far as capacitance is concerned, associated with the anodizing method and electrolytes of the present invention and improvements can be readily demonstrated.

The invention has been described with particular emphasis on the preferred embodiments. It would be realized from the teachings herein that other embodiments, alterations, and configurations could be employed without departing from the scope of the invention which is more specifically set forth in the claims which are appended hereto.

The invention claimed is:

1. A capacitor prepared by the process of
    fabricating an aluminum plate;
    pre-hydrating said aluminium plate;
    contacting said plate with an anodizing solution comprising glycerine, about 0.1 to about 2.0%, by weight, water and about 0.01 to about 0.5%, by weight, orthophosphate;
    applying a voltage to said aluminum plate of at least about 220 volts.

2. A device comprising a capacitor of claim 1.

3. The device of claim 2 wherein said device is an implantable medical device.

4. A capacitor prepared by the process of
    fabricating an aluminum plate;
    pre-hydrating said aluminium plate;
    contacting said plate with an anodizing solution comprising glycerine, about 0.1 to about 2.0%, by weight, water and about 0.01 to about 0.5%, by weight, orthophosphate;
    applying a voltage to said aluminum plate and determining an initial current;
    maintaining said first voltage until a first measured current is no more than 50% of said initial current;
    increasing said voltage and redetermining said initial current;
    maintaining said increased voltage until a second measured current is no more than about 50% of said redetermined initial current, and
    continuing said increasing said voltage and said maintaining said increased voltage until a final voltage is achieved.

5. A device comprising a capacitor of claim 4.

6. The device of claim 5 wherein said device is an implantable medical device.

7. A capacitor comprising:
    an etched aluminum anode and a dielectric layer comprising phosphate doped aluminum oxide;
    prepared by the process of:
    forming an aluminum plate;
    pre-hydrating said aluminium plate;

contacting said plate with an anodizing solution comprising glycerine, about 0.1 to about 2.0%, by weight, water and about 0.01 to about 0.5%, by weight, orthophosphate;

applying a voltage to said aluminum plate and determining an initial current;

maintaining said first voltage until a first measured current is no more than about 50% of said initial current;

increasing said voltage and redetermining said initial current;

maintaining said increased voltage until a second measured current is no more than 50% of said redetermined initial current, and continuing said increasing said voltage and said maintaining said increased voltage until a final voltage is achieved.

* * * * *